United States Patent
Wang et al.

(10) Patent No.: US 7,471,661 B1
(45) Date of Patent: Dec. 30, 2008

(54) METHODS AND APPARATUS FOR SUPPORTING PROXY MOBILE IP REGISTRATION IN A WIRELESS LOCAL AREA NETWORK

(75) Inventors: Huizhao Wang, San Jose, CA (US); Kent K. Leung, Mountain View, CA (US); Waseem A. Siddiqi, Santa Clara, CA (US); Christine Andiazabal, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 974 days.

(21) Appl. No.: 10/080,995

(22) Filed: Feb. 20, 2002

(51) Int. Cl.
*H04Q 7/24* (2006.01)
*H04L 12/28* (2006.01)
*H04L 12/56* (2006.01)

(52) U.S. Cl. ........................ 370/338; 370/392
(58) Field of Classification Search .................. None
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,276,680 A | 1/1994 | Messenger |
| 5,371,852 A | 12/1994 | Attanasio et al. |
| 5,473,599 A | 12/1995 | Li et al. |
| 5,490,139 A | 2/1996 | Baker et al. |

(Continued)

FOREIGN PATENT DOCUMENTS

EP 0924913 6/1999

(Continued)

OTHER PUBLICATIONS

Release notes for 3Com Corporation, "Conducting a Redundant Route for Network Resiliency", Mar. 1994, *NET Builder Family Bridge/Router* pp. 26-29.

(Continued)

*Primary Examiner*—Daniel J Ryman
(74) *Attorney, Agent, or Firm*—Weaver Austin Villeneuve & Sampson LLP

(57) ABSTRACT

Methods and apparatus for enabling mobility of a node that does not support Mobile IP are disclosed. Access point information is maintained for all functioning access points. In accordance with one embodiment, an authoritative access point (AAP) maintains access point information for all functioning access points (APs) and sends updates for all additions or other modifications to the continually changing access point information to enable APs to store a local copy of the AP information. For instance, when an AP goes offline, the access point information for that AP will be removed from the set of access point information, and notification of this removal is sent to other APs so that the local copy of the AP information may be similarly updated. As another example, when an AP comes online, it will send its AP information to the AAP. The AAP will store the AP information and provide this new AP information to other "active" APs. The AP information preferably includes an AP subnet and a gateway. When an AP receives a data packet, the AP may compare the data packet (e.g., source address) with the AP information (e.g., AP subnet) for one or more APs to determine whether to send a registration request on behalf of the node. For instance, the registration request may specify the gateway as the node's Home Agent.

32 Claims, 9 Drawing Sheets

U.S. PATENT DOCUMENTS

| | | | |
|---|---|---|---|
| 5,570,366 | A | 10/1996 | Baker et al. |
| 5,572,528 | A | 11/1996 | Shuen |
| 5,619,552 | A | 4/1997 | Karppanen et al. |
| 5,729,537 | A | 3/1998 | Billstrom |
| 5,751,799 | A | 5/1998 | Mori |
| 5,805,702 | A | 9/1998 | Curry et al. |
| 5,825,759 | A | 10/1998 | Liu |
| 5,862,345 | A | 1/1999 | Okanoue et al. |
| 5,978,672 | A | 11/1999 | Hartmaier et al. |
| 6,016,428 | A | 1/2000 | Diachina et al. |
| 6,055,236 | A | 4/2000 | Nessett et al. |
| 6,061,650 | A | 5/2000 | Malkin et al. |
| 6,075,783 | A | 6/2000 | Voit |
| 6,078,575 | A | 6/2000 | Dommety et al. |
| 6,079,020 | A | 6/2000 | Liu |
| 6,081,507 | A | 6/2000 | Chao et al. |
| 6,122,268 | A | 9/2000 | Okanoue et al. |
| 6,131,095 | A | 10/2000 | Low et al. |
| 6,137,791 | A | 10/2000 | Frid et al. |
| 6,144,671 | A | 11/2000 | Perinpanathan et al. |
| 6,154,839 | A | 11/2000 | Arrow et al. |
| 6,163,843 | A | 12/2000 | Inoue et al. |
| 6,167,513 | A | 12/2000 | Inoue et al. |
| 6,172,986 | B1 | 1/2001 | Watanuki et al. |
| 6,173,399 | B1 | 1/2001 | Gilbrech |
| 6,175,917 | B1 | 1/2001 | Arrow et al. |
| 6,195,705 | B1 * | 2/2001 | Leung ............ 709/245 |
| 6,226,748 | B1 | 5/2001 | Bots et al. |
| 6,226,751 | B1 | 5/2001 | Arrow et al. |
| 6,230,012 | B1 | 5/2001 | Willkie et al. ............ 455/435 |
| 6,240,089 | B1 | 5/2001 | Okanoue et al. |
| 6,256,300 | B1 | 7/2001 | Ahmed et al. |
| 6,272,129 | B1 | 8/2001 | Dynarski et al. ............ 370/356 |
| 6,308,267 | B1 | 10/2001 | Gremmelmaier ............ 713/168 |
| 6,339,830 | B1 | 1/2002 | See et al. |
| 6,377,982 | B1 * | 4/2002 | Rai et al. ............ 709/217 |
| 6,393,482 | B1 | 5/2002 | Rai et al. |
| 6,396,828 | B1 | 5/2002 | Liu ............ 370/352 |
| 6,400,722 | B1 | 6/2002 | Chuah et al. |
| 6,445,922 | B1 | 9/2002 | Hiller et al. |
| 6,452,920 | B1 | 9/2002 | Comstock |
| 6,466,964 | B1 * | 10/2002 | Leung et al. ............ 709/202 |
| 6,473,413 | B1 | 10/2002 | Chiou et al. ............ 370/331 |
| 6,496,491 | B2 | 12/2002 | Chuah et al. |
| 6,496,855 | B1 | 12/2002 | Hunt et al. ............ 709/217 |
| 6,510,144 | B1 | 1/2003 | Dommety et al. |
| 6,515,974 | B1 * | 2/2003 | Inoue et al. ............ 370/331 |
| 6,522,880 | B1 | 2/2003 | Verma et al. |
| 6,535,493 | B1 | 3/2003 | Lee et al. ............ 370/329 |
| 6,571,289 | B1 | 5/2003 | Montenegro |
| 6,577,643 | B1 | 6/2003 | Rai et al. ............ 370/466 |
| 6,578,085 | B1 | 6/2003 | Khalil et al. ............ 709/241 |
| 6,587,882 | B1 | 7/2003 | Inoue et al. |
| 6,597,882 | B1 | 7/2003 | Tanaka ............ 399/258 |
| 6,625,135 | B1 | 9/2003 | Johnson et al. ............ 370/332 |
| 6,651,105 | B1 | 11/2003 | Bhagwat et al. ............ 709/239 |
| 6,657,981 | B1 | 12/2003 | Lee et al. |
| 6,665,537 | B1 | 12/2003 | Lioy ............ 455/435.1 |
| 6,675,208 | B1 | 1/2004 | Rai et al. |
| 6,683,871 | B1 | 1/2004 | Lee et al. |
| 6,684,241 | B1 | 1/2004 | Sandick et al. |
| 6,701,437 | B1 | 3/2004 | Hoke et al. |
| 6,707,809 | B1 | 3/2004 | Warrier et al. |
| 6,742,036 | B1 | 5/2004 | Das et al. ............ 709/226 |
| 6,760,444 | B1 | 7/2004 | Leung |
| 6,763,007 | B1 | 7/2004 | La Porta et al. |
| 6,795,857 | B1 * | 9/2004 | Leung et al. ............ 709/224 |
| 6,810,259 | B1 * | 10/2004 | Zhang ............ 455/456.5 |
| 6,947,401 | B2 | 9/2005 | El-Malki et al. |
| 6,973,068 | B2 | 12/2005 | Inoue et al. |
| 6,982,967 | B1 | 1/2006 | Leung |
| 6,996,084 | B2 | 2/2006 | Troxel et al. |
| 7,079,499 | B1 | 7/2006 | Akhtar et al. |
| 7,080,151 | B1 | 7/2006 | Borella et al. |
| 7,130,629 | B1 | 10/2006 | Leung et al. |
| 7,134,012 | B2 | 11/2006 | Doyle et al. |
| 7,152,238 | B1 | 12/2006 | Leung et al. |
| 7,161,913 | B2 | 1/2007 | Jung |
| 7,170,892 | B2 | 1/2007 | Major |
| 7,216,159 | B2 | 5/2007 | Hirose et al. |
| 7,236,469 | B2 | 6/2007 | Yokota et al. |
| 7,260,638 | B2 | 8/2007 | Crosbie |
| 7,289,631 | B2 | 10/2007 | Ishidoshiro |
| 7,362,742 | B1 | 4/2008 | Siddiqi et al. |
| 2001/0005369 | A1 | 6/2001 | Kloth |
| 2001/0036184 | A1 | 11/2001 | Kinoshita et al. |
| 2002/0018456 | A1 * | 2/2002 | Kakemizu et al. ............ 370/338 |
| 2002/0026527 | A1 | 2/2002 | Das et al. ............ 709/245 |
| 2002/0075866 | A1 | 6/2002 | Troxel et al. |
| 2002/0078238 | A1 | 6/2002 | Troxel et al. |
| 2002/0080752 | A1 | 6/2002 | Johansson et al. |
| 2002/0147837 | A1 * | 10/2002 | Heller ............ 709/238 |
| 2002/0188562 | A1 | 12/2002 | Igarashi et al. |
| 2003/0021275 | A1 | 1/2003 | Shaber |
| 2003/0123421 | A1 * | 7/2003 | Feige et al. ............ 370/338 |
| 2003/0212794 | A1 | 11/2003 | Touati et al. |
| 2004/0024901 | A1 | 2/2004 | Agrawal et al. ............ 709/238 |
| 2004/0081086 | A1 * | 4/2004 | Hippelainen et al. ............ 370/227 |
| 2004/0103282 | A1 | 5/2004 | Meier et al. |
| 2004/0109452 | A1 | 6/2004 | Takihiro et al. |
| 2004/0208187 | A1 | 10/2004 | Mizell et al. |
| 2004/0213172 | A1 | 10/2004 | Myers et al. |
| 2004/0213260 | A1 | 10/2004 | Leung |

FOREIGN PATENT DOCUMENTS

| | | | |
|---|---|---|---|
| EP | 0978977 | A1 | 9/2000 |
| EP | 1124396 | A2 | 8/2001 |

OTHER PUBLICATIONS

J. Moy, RFC 1247 "OSPF Version 2", Jul. 19, 1991.
D. Oran, RFC 1142 "OSI IS-IS Intra-domain Routing Protocol", Feb. 1990.
Uyless Black, "TCP/IP and Related Protocols", 1992, *McGraw-Hill, Inc.*, pp. 226-249.
T. Li, et al., RFC 2281 "Cisco Hot Standby Router Protocol (HSRP)", Oct. 27, 1997.
Chambless, et al., "Home Agent Redundancy Protocol (HARP)", Oct. 27, 1997.
C. Perkins, Network Working Group, RFC 2002 "IP Mobility Support", Oct. 1996.
B. Adoba, et al., Network Working Group, RFC 2486 "The Network Access Identifier", Jan. 1999.
"Mobile IP", Release 12.0(1)T, pp. 1-55, no publication date?
Montenegro, G., "Reverse Tunneling for Mobile IP", RFC 2344, Sun Microsystems, Inc., pp. 1-19, May 1998.
D. Harkins and D. Carrel, "The Internet Key Exchange (IKE)", Cisco Systems, pp. 1-33, Jun. 1998.
D. Cong and M. Hamlen and C. Perkins, "The Definitions of Managed Objects for IP Mobility Support using SMIv2", RFC 2006, Motorola and IBM, pp. 1-52, Oct. 1996.
C. Finseth, "An Access Control Protocol, Sometimes Called TACACS", RFC 1492, pp. 1-15, Sep. 13, 1992.
D. Carrel and Lol Grant, "The TACACS+ Protocol", Network Working Group, Internet-Draft, Cisco Systems, pp. 1-42, Jan. 1997.
C. Rigney, "RADIUS Accounting", RFC 2139, Livingston, pp. 1-25, Apr. 1997.
C. Rigney, et al., "Remote Authentication Dial in User Service (RADIUS)", RFC 2138, pp. 1-65, Apr. 1997.
Perkins & Hobby, Network Working Group, RFC 1172 "The Point-to-Point Protocol (PPP) Initial Configuration Options," Jul. 1990.
W. Simpson, Network Working Group, RFC 1994 PPP Challenge Handshake Authentication Protocol (CHAP), Aug. 1996.

R. Droms, "Dynamic Host Configuration Protocol", RFC 2131, Mar. 1997, pp. 1-39.

Lloyd, et al., Network Working Group, RFC 1334 "PPP Authentication Protocols", Oct. 1992.

McGregor, Network Working Group, RFC 1332 "The PPP Internet Control Protocol (IPCP)", May 1992.

Simpson, ed., Network Working Group, RFC 1661, "The Point-to-Point Protocol (PPP)", Jul. 1994.

Calhoun and Perkins, "Mobile IP Network Access Identifier Extension for IPv4", Jan. 12, 2000.

Postel, J., "Simple Mail Transfer Protocol", STD 10, RFC 821, Aug. 1982.

Crocker, D. and P. Overrell, "Augmented BNF For Syntax Specifications: ABNF", RFC 2234, Nov. 1997.

Kent K. Leung, U.S. Appl. No. 09/227,399, "Mobile IP Authenticatioon", filed Jan. 9, 1999.

Helmy et al., "Efficient Micro-Mobility using Intra-Domain Multicast-Based Mechanisms (M&M)", ACM SIGCOMM Computer Communications Review, vol. 32, No. 5: Nov. 2002, pp. 61-72, XP-002279254.

C. Perkins, (Editor): "IP Mobility Support, RFC 2002," Oct. 1996, 55 pages.

R. Droms, *Dynamic Host Configuration Protocol*, RFC 2131, Mar. 1997, pp. 1-39.

*International Search Report PCT/US 03/38568*, 4 pp., mailed May 21, 2004.

*International Search Report PCT/US2004/013365*, 7 pp., mailed Oct. 5, 2004.

C. Perkins, "IP Mobility Support," RFC 2002, IBM Corporation, Oct. 1996, 80 pgs.

Charles Perkins, "Mobile IP Design Principles and Practices", Addison Wesley, 1998, pp. 50, 55-59, 83, 78.

U.S. Office Action dated Dec. 15, 2006 from related U.S. Appl. No. 10/321,080, 11 pgs. (CISCP322).

U.S. Office Action dated Jul. 3, 2007 from related U.S. Appl. No. 10/321,080, 11 pgs. (CISCP322).

U.S. Office Action mailed Jan. 25, 2007 from related U.S. Appl. No. 10/354,690, 26 pgs. (CISCP324).

U.S. Office Action mailed Jul. 3, 2007 from related U.S. Appl. No. 10/354,690, 18 pgs. (CISCP324).

Mobile Networking Through Mobiel IP, Perkins, IEEE 1998.

U.S. Office Action dated Apr. 17, 2007 from related U.S. Appl. No. 10/426,106, 9 pgs. (CISCP338).

U.S. Office Action dated Jun. 15, 2007 from related U.S. Appl. No. 10/426,106, 13 pgs. (CISCP338).

U.S. Office Action dated Jun. 4, 2007 from related U.S. Appl. No. 10/874,676, 14 pgs. (CISCP369).

U.S. Office Action dated Nov. 28, 2007 from related U.S. Appl. No. 10/874,679, 16 pgs. (CISCP369).

Notice of Allowance and Allowed Claims dated Nov. 29, 2007 from U.S. Appl. No. 10/354,690, 16 pgs. (CISCP324).

U.S. Office Action dated Dec. 12, 2007 from related U.S. Appl. No. 10/321,080, 10 pgs. (CISCP322).

U.S. Office Action dated Dec. 12, 2007 from related U.S. Appl. No. 10/426,106, 12 pgs. (CISCP338).

Office Action dated Apr. 29, 2008 from related U.S. Appl. No. 10/426,106, 15 pgs. (CISCP338).

* cited by examiner

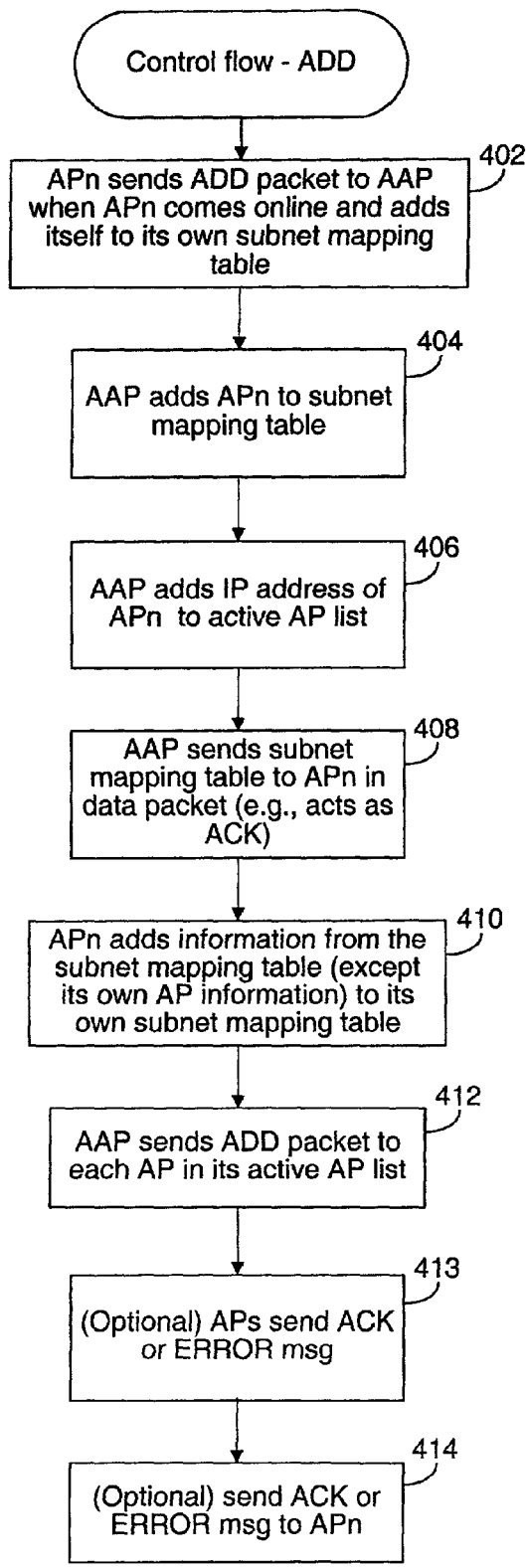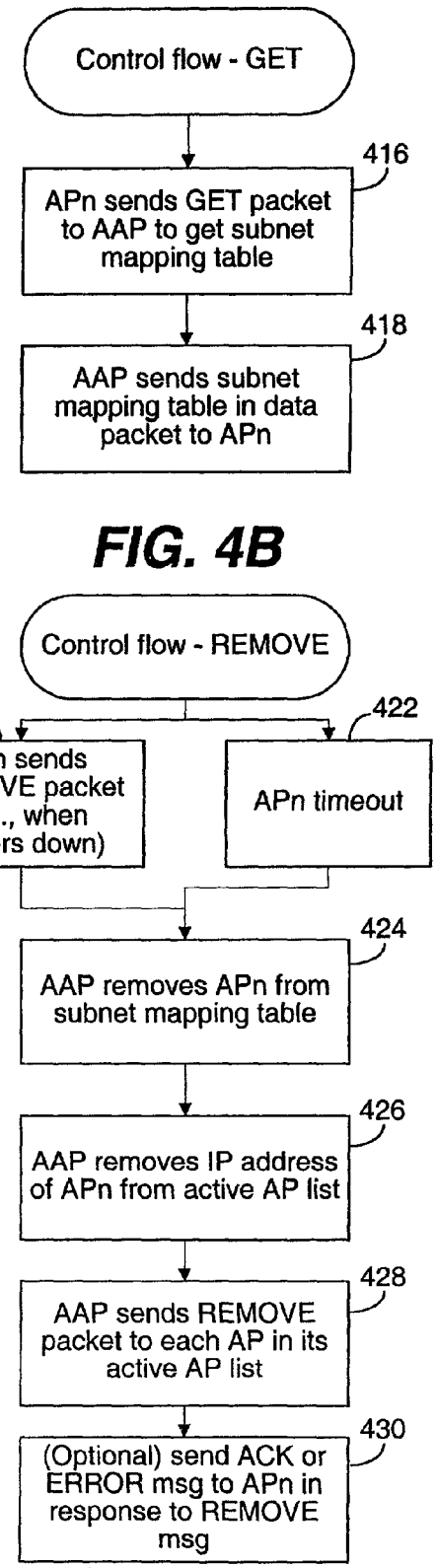
FIG. 4A
FIG. 4B
FIG. 4C

Subnet mapping table — 602

| Subnet (604) | netmask (606) | gateway (608) | AP IP address (610) |
|---|---|---|---|
|  |  |  |  |
|  |  |  |  |
|  |  |  |  |

FIG. 6

Active AP list — 702

| |
|---|
| AP1 IP Adress — 704 |
| AP2 IP Adress |
| . |
| . |
| APN IP Adress |

FIG. 7

METHODS AND APPARATUS FOR SUPPORTING PROXY MOBILE IP REGISTRATION IN A WIRELESS LOCAL AREA NETWORK

BACKGROUND OF THE INVENTION

1. Field of the Invention

The present invention relates to Mobile IP network technology. More particularly, the present invention relates to enabling mobility for a node that changes its location within a network through the use of control messages that are sent and received by access points.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

It is often desirable to assign a unique IP address to each user or device within a network. Moreover various protocols enable automatic assignment of IP addresses within a particular network. For instance, in accordance with the Dynamic Host Configuration Protocol (DHCP), network administrators may manage a network centrally and automate the assignment of Internet Protocol (IP) addresses in an organization's network. More particularly, using the Internet's set of protocols (TCP/IP), each device that is capable of connecting to the Internet needs a unique IP address. When an organization sets up its computer users with a connection to the Internet, an IP address must be assigned to each machine. Without DHCP, the IP address must be entered manually at each computer and, if computers move to another location in another part of the network, a new IP address must be entered. DHCP allows a network administrator to supervise and distribute IP addresses from a central point and automatically sends a new IP address when a computer is plugged into a different location within the network.

DHCP uses the concept of a "lease" or amount of time that a given IP address will be valid for a computer. The lease time can vary depending on how long a user is likely to require the Internet connection at a particular location. DHCP is particularly useful in education and other environments where users change frequently. Using very short leases, DHCP can dynamically reconfigure networks in which there are more computers than there are available IP addresses. Thus, DHCP supports static addresses for computers containing Web servers that need a permanent IP address.

Although DHCP functions in a static environment, the assignment of a new IP address each time a computer changes its location within a network is far from ideal within a mobile environment. More particularly, when a mobile node roams to a new location within a network, it would be desirable for the node to maintain its home address. However, provisions have not been made for a node that wishes to maintain a single IP address when it changes its location within a network using DHCP. Moreover, a node that is not mobile enabled cannot currently change its location within a network using DHCP and still maintain its assigned IP address.

In view of the above, it would be desirable to provide Internet services via a wireless link for mobile users who attach to a network via a connection such as a DHCP connection. Moreover, it would be beneficial if such capabilities could be provided even where the node does not support Mobile IP.

SUMMARY OF THE INVENTION

The present invention provides proxy mobile IP support for a node that changes its location within a network. This is accomplished, in part, through the communication between access points within the network. An Access Point (AP) is the center point in an all-wireless network or serves as a connection point between a wired and a wireless network. Multiple APs can be placed throughout a facility to give users with WLAN adapters the ability to roam freely throughout an extended area while maintaining uninterrupted access to all network resources. Through the use of such communication, access point information associated with multiple APs may be maintained, enabling registration and de-registration of the node with a Home Agent to be initiated by an Access Point. Once registered with the Home Agent, packets may be forwarded by the Home Agent to the Foreign Agent. Moreover, the access point may also redirect packets sent by the node to the Foreign Agent, enabling the redirected packets to be sent to the appropriate destination by the Foreign Agent.

In accordance with one aspect of the invention, methods and apparatus for supporting a node that does not support Mobile IP are disclosed. An authoritative access point (AAP) maintains network subnet information as well as access point information for all functioning access points (APs) (i.e., active APs) and sends updates to the functioning APs regarding additions or other modifications to the continually changing access point information. For instance, when an AP goes offline, the access point information for that AP will be removed from the set of access point information, and notification of this removal is sent to other APs so that the local copy of the AP information may be similarly updated. As another example, when an AP comes online, it will send its AP information to the AAP. The AAP will store the AP information and provide this new AP information to other "active" APs. The AP information preferably includes an AP subnetwork (subnet) and a gateway.

In accordance with another aspect of the invention, methods and apparatus for sending a mobile IP registration request on behalf of a node that does not support Mobile IP are disclosed. When an AP receives a data packet, the AP may compare the data packet (e.g., source address) with the AP information for one or more APs to determine whether to send a registration request on behalf of the node. More particularly, the AP determines from the source address whether the node is located on a subnet identical to a subnet of the AP. If the node is located on the subnet of the AP, no Mobile IP service is required on behalf of the node. However, when it is determined from the source address that the node is not located on the subnet identical to the subnet of the Access Point, the AP composes and sends a mobile IP registration request on behalf of the node. For instance, the mobile IP registration request may be composed using the gateway associated with the "home" AP (e.g., having a matching subnet) as the node's Home Agent.

BRIEF DESCRIPTION OF THE DRAWINGS

FIGS. 4A through 4C are control flow diagrams illustrating a method of modifying a subnet mapping table in accordance with various embodiments of the invention.

FIG. 6 is a diagram illustrating an exemplary subnet mapping table that may be maintained by an AP in accordance with various embodiments of the invention.

FIG. 7 is a diagram illustrating an exemplary active AP list that may be maintained by an AAP in accordance with various embodiments of the invention.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

An invention is described herein that enables a node (e.g., a node that does not implement the Mobile IP protocol) to roam to various Foreign Agents within a network such as a DHCP supported network. This is accomplished, in part, through the use of control messages sent between the access points within the network. For purposes of the following discussion, the term "mobile node" will be used to refer to a mobile node implementing the Mobile IP protocol while the term "node" will be used to refer to a node that does not implement the Mobile IP protocol.

Figure 1:
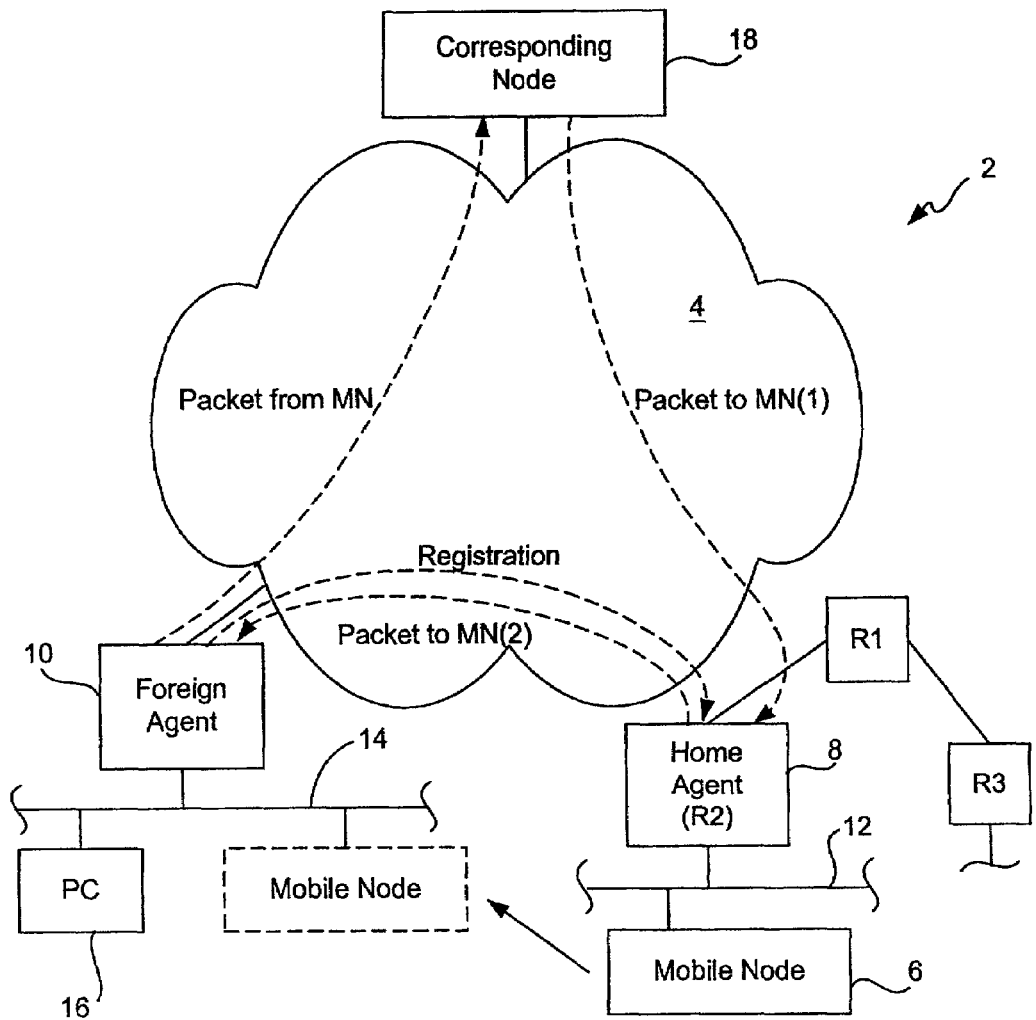
FIG. 1 is a diagram illustrating a Mobile IP network segment and associated environment.
Figure 2:
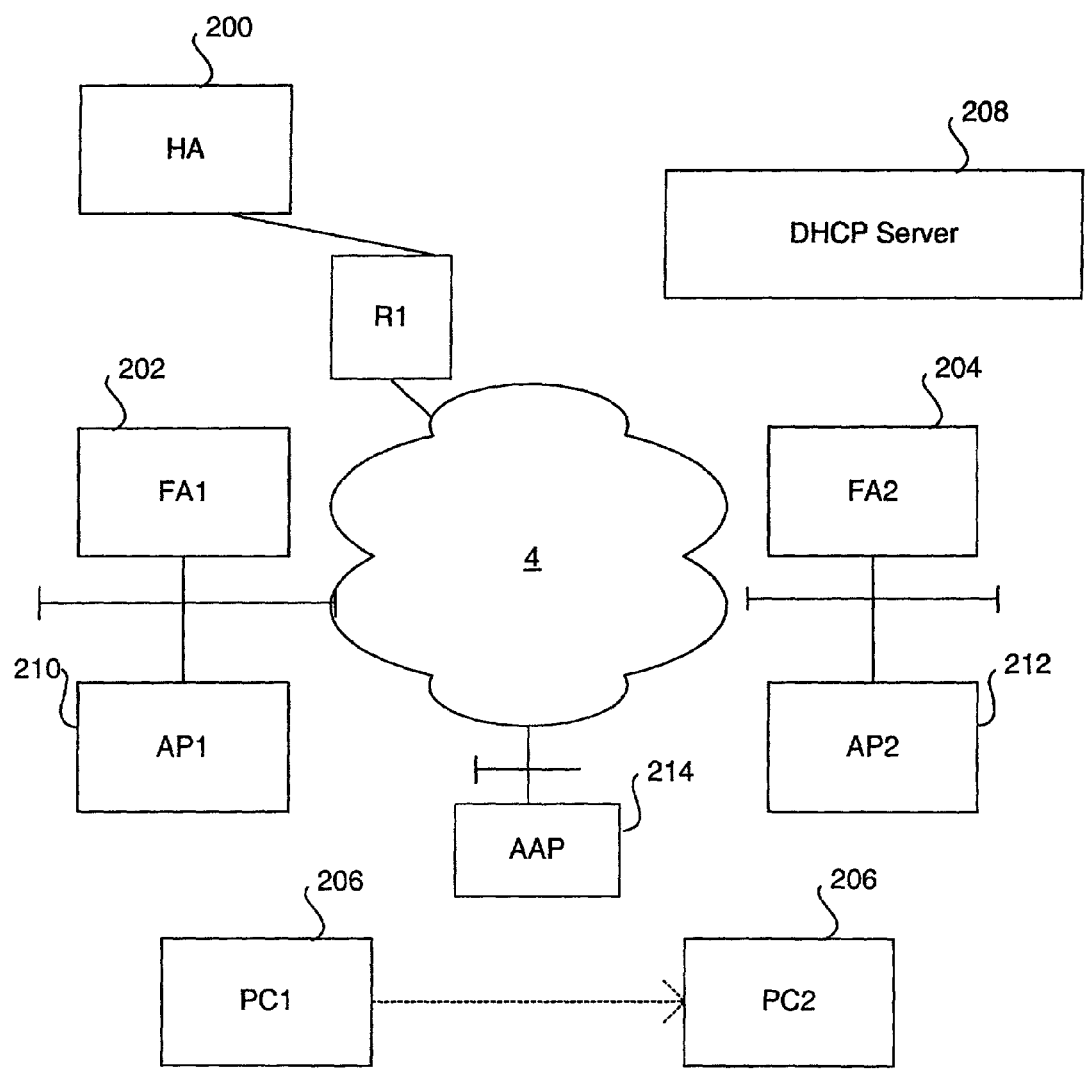
FIG. 2 is a diagram illustrating a system including multiple access points that may be used to implement the present invention.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network. As shown, a node 206 may wish to roam from its Home Agent 200 to a first Foreign Agent 202. Similarly, once attached to the first Foreign Agent 202, the node 206 may again wish to roam to a second Foreign Agent 204. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In a wireless network, Access Points 210 and 212 are coupled to the Foreign Agents 202 and 204. By way of example, in a wireless network, the Access Points 210 and 212 may have an antenna and receiver for receiving packets. As yet another example, the Access Points 210 and 212 may designate connection points in a non-wireless network. Typically, a mobile node implementing Mobile IP registers and de-registers with its Home Agent through the registration process. However, according to the present invention, registration is initiated by the Access Point on behalf of the Mobile IP node. Similarly, de-registration may be initiated by the Access Point on behalf of the roaming node. For instance, node 206 that has roamed to the first Foreign Agent 202 is registered with the node's Home Agent 200 when the first Access Point 206 composes and sends a registration request packet via the first Foreign Agent 202. Thus, the first Foreign Agent's visitor table and the Home Agent's mobility binding table are updated to indicate that the node has roamed to the first Foreign Agent 202. When the node 206 roams to the second Foreign Agent 204, the node 206 is de-registered (e.g., by one of the Access Points 210, 212, either of the Foreign Agents 202, 204 or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent. Alternatively, the visitor table may be maintained and updated by the Access Point.

Three exemplary methods of detecting a node are listed here. First, a node may be detected upon receipt of an Address Resolution Protocol (ARP) request. More particularly, in order to send a packet to a destination IP address, a node must obtain the MAC address or "link-layer address" associated with the destination IP address. A node typically obtains a MAC address associated with an intended destination IP address by sending an ARP request to the Foreign Agent via the Access Point. Second, a node may attempt to send an actual data packet via the Foreign Agent. Thus, in this instance, the receipt of the data packet by the Access Point triggers the sending of a control packet (i.e., registration request packet) by the Access Point. Third, an access point control packet may be received. For instance, when a device communicates with an access point, the access point composes and sends a registration request packet via the Foreign Agent. This third method is preferred since continuously sending ARP requests and listening to data packets provides an unnecessary amount of traffic in a network having a limited bandwidth.

In accordance with one embodiment of the invention, access point control messages are used by an authoritative access point (AAP) and one or more access points to communicate information about the respective access points. More particularly, access point information may be transmitted among the access points so that each access point may store a local copy of the access point information. This access point information may be used to determine whether a node has roamed to a particular access point, and therefore requires proxy Mobile IP service.

The present invention enables an Access Point (AP) that supports Mobile IP to perform proxy registration on behalf of a node that does not support Mobile IP. This is accomplished by maintaining AP information for active APs. In accordance with one embodiment, multiple APs maintain identical local copies of a subnet mapping table that stores AP information for the multiple APs. More specifically, when an AP comes online, it is considered "active" and provides its AP information to other active APs. This exchange and distribution of AP information is preferably performed via an authoritative AP (AA) responsible for receiving AP information from a newly active AP and distributing that received AP information to other active APs. Similarly, the authoritative AP also provides the newly active AP with AP information from the other active APs. Thus, the AAP and all other APs maintain identical subnet mapping tables. From the AP information in the subnet mapping table, an AP may ascertain when Mobile IP service is required, thereby enabling the AP to compose and send a Mobile IP registration request on behalf of the node.

Figure 3:
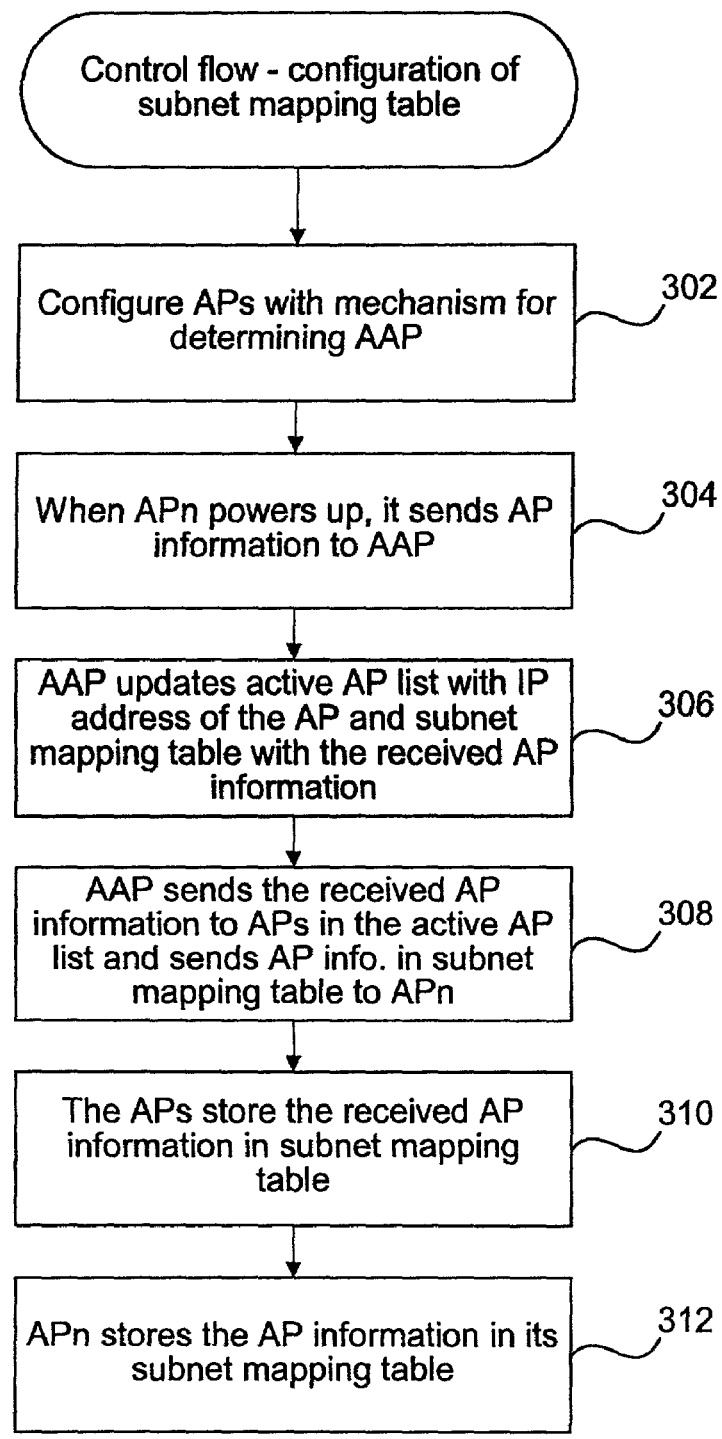
FIG. 3 is a control flow diagram illustrating a method of configuring subnet mapping tables associated with the AAP and APs in accordance with one embodiment of the invention.

FIG. 3 is a control flow diagram illustrating a method of configuring subnet mapping tables associated with the AAP and APs in accordance with one embodiment of the invention. As shown at block 302 all "subordinate" APs are configured with a mechanism for determining the AAP. For instance, the APs may be statically configured with the identity (e.g., IP address) of the AAP. Alternatively, the APs may dynamically ascertain the identity of the AAP. For instance, the AAP may be the first AP to be powered on, which signals the other APs that it is the AAP. When each AP powers up, it sends AP information to the AAP at block 304. For instance, the access point information preferably includes an access point subnet and a gateway (e.g., IP address), and may also include a subnet mask and IP address for the access point. In order to keep track of all active APs, the AAP updates a list of active access points at block 306 to include the newly active access point. An exemplary active AP list will be described in further detail below with reference to FIG. 7. The list of active access points identifies one or more active access points. For instance, the list may include an IP address for each of the active access points. In addition, the access point information is stored. As will be described in further detail below with reference to FIG. 6, the access point information for one or more active access points may be stored in a subnet mapping table.

In addition to updating its own subnet mapping table, the AAP sends the access point information for the newly active AP to all other active APs identified in the active AP list, as well as any additional AP information associated with other active APs from the subnet mapping table to the newly active AP at block 308. As described above, the active AP list may identify one or more active access points. Upon receipt of the access point information, the active APs store the received AP information at block 310. In addition, it is important to note that at block 312 the newly active AP also stores its own AP information (e.g., in its subnet mapping table) as well as that received from the AAP at block 308. For instance, the AP information may be stored in a subnet mapping table such as that described below with reference to FIG. 6. In this manner, all APs (including the AAP) maintain consistent AP information, thereby enabling each access point to compare a received data packet with that AP information to determine whether Mobile IP service is required.

FIGS. 4A through 4C are control flow diagrams illustrating a method of updating a subnet mapping table in accordance with various embodiments of the invention. FIG. 4A is a control flow diagram illustrating a method of configuring subnet mapping tables. As described above with reference to block 304, when an AP powers up, it sends its AP information to the AAP. In addition, AP information for one or more other APs is sent to the AP. In accordance with one embodiment, AP information may be transmitted in an ADD packet. An exemplary ADD packet will be described in further detail below with reference to FIG. 8. When an AP powers up, it sends an ADD packet including its AP information to the AAP at block 402 and adds its AP information to its local subnet mapping table. The AAP adds the AP information for the newly active AP to its subnet mapping table at block 404 and adds the IP address of the newly active AP to its active AP list at block 406. The AAP then sends its subnet mapping table to the newly active AP at block 408. For instance, the subnet mapping table may be transmitted in a data packet. This data packet therefore serves two purposes. First, the data packet transmits the AP information for the other active APs to the newly active AP. Second, the data packet serves as an acknowledgement to the ADD packet. Upon receipt of the data packet, the newly active AP adds the received AP information from the AAP's subnet mapping table to its own local subnet mapping table at block 410. In addition, the AAP sends an ADD packet including the AP information for the newly active AP to all other active APs identified in its active AP list at block 412. In response, the receiving active APs may send either an acknowledgement (ACK) message or an error message at 413. Upon completion, the AAP may send an ACK message at block 414 to the newly active AP. However, if an error occurs, the AAP may send an error message to the newly active AP in response to its ADD packet. For instance, it is possible that an active AP will not be able to add the AP information for the newly active AP to its subnet mapping table in the event that an AP fails or its memory is limited.

Once an active AP has configured its subnet mapping table, the table may become corrupted or otherwise need to be refreshed with the subnet mapping table maintained by the AAP. FIG. 4B is a control flow diagram illustrating one method of retrieving the subnet mapping table maintained by the AAP. As shown, the AP sends a GET packet to the AAP to obtain its subnet mapping table at block 416. The AAP then sends its subnet mapping table in a data packet to the AP at block 418. An exemplary GET packet will be described below in further detail with reference to FIG. 10. Thus, the GET packet may serve as a request to obtain AP information associated with one or more APs. In this manner, an AP may obtain the current version of the subnet mapping table in the event of an error.

Rather than adding AP information to a subnet mapping table or obtaining information from a subnet mapping table, it may be desirable to remove AP information from a subnet mapping table. FIG. 4C is a control flow diagram illustrating a method of removing AP information from a subnet mapping table. When an AP powers down as shown at block 420, it sends a REMOVE packet to the AAP. A REMOVE packet serves to instruct the receiving AP to delete access point information specified by the REMOVE packet. Alternatively, the AAP may detect a timeout of the AP at block 422. For instance, a timeout may be detected when the AAP sends an UPDATE message and the AP does not respond within a specified period of time. In either case, the AAP removes the AP information associated with the AP from the AAP's subnet mapping table at block 424. In addition, the AAP removes the IP address of the AP from its active AP list at block 426. The AAP then sends a REMOVE packet to all other APs in its active AP list at block 428 to instruct those APs to also remove the AP information from their local subnet mapping tables. These APs may then send an ACK message at block 430 in response to the REMOVE packet. Alternatively, an ERROR message may be sent if the AP information cannot be deleted (e.g., if it was not stored initially).

Figure 5:
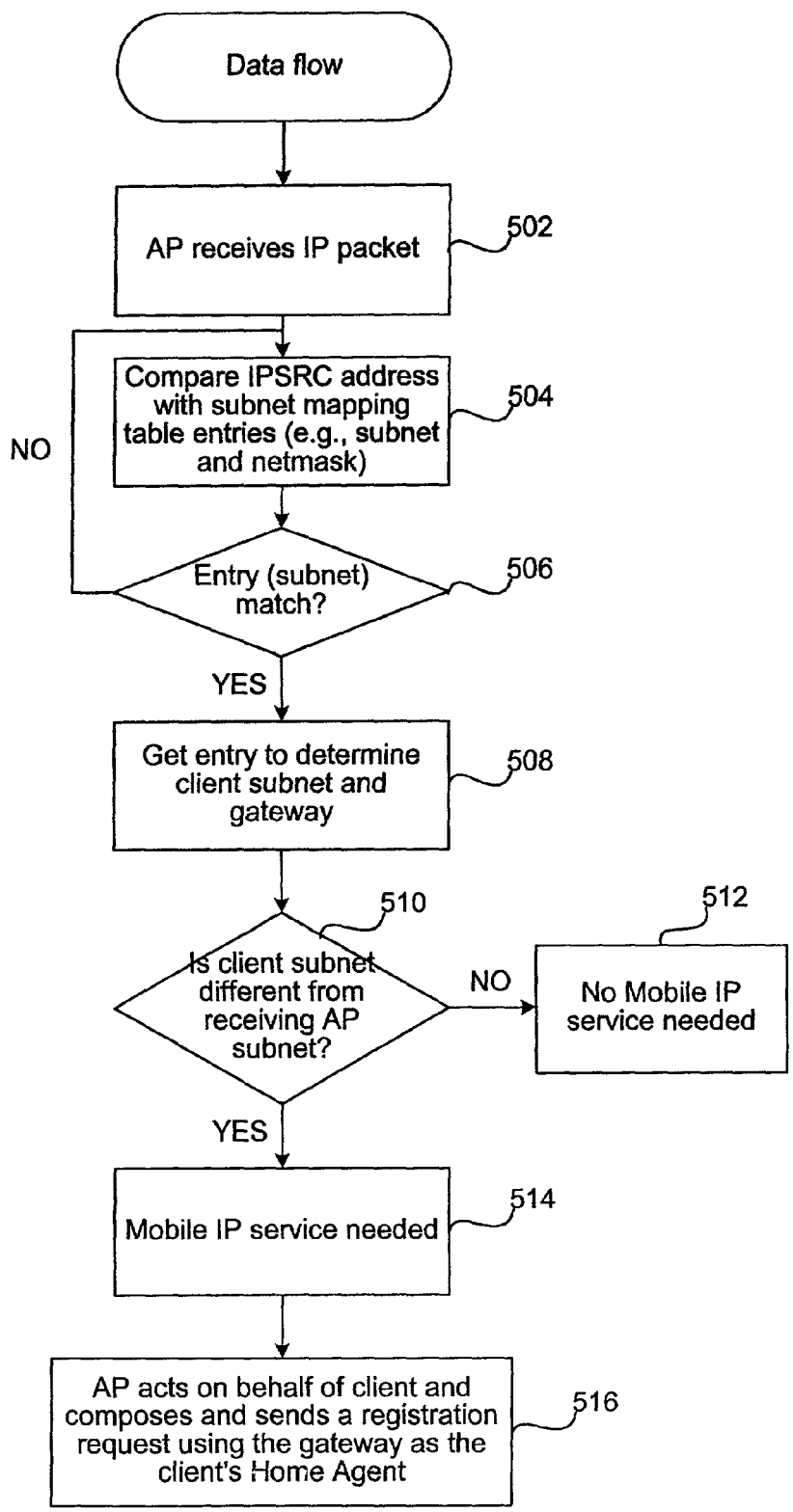
FIG. 5 is a data flow diagram illustrating a method of processing an IP packet received by an AP in accordance with various embodiments of the invention.

Once an AP is configured with AP information for one or more APs, such as that stored in a subnet mapping table described below with reference to FIG. 6, the AP may determine whether data packets received by it requires proxy Mobile IP service. FIG. 5 is a data flow diagram illustrating a method of processing an IP packet received by an AP in accordance with various embodiments of the invention. As shown at block 502, the Access Point receives a data packet specifying a source address. The AP then determines from the source address whether the node is located on a subnet identical to a subnet of the Access Point at blocks 504 through 510. More specifically, the AP compares the source address with access point information associated with one or more access points, where the access point information includes an access point subnet at block 504. For instance, the access point information may be stored in a subnet mapping table. In addition, the access point information for an AP also preferably includes a netmask which is also used in the comparison, and a gateway which may be used as the node's Home Agent. The AP ascertains the access point subnet identical to that of the node at block 506 by identifying the matching subnet entry at block 506. The entry in the subnet mapping table is then obtained at block 508 to determine the node subnet and gateway. The AP then determines whether the access point subnet identical to that of the node is different from the subnet of the Access Point at block 510. When the AP determines from the source address that the node is located on the subnet identical to the subnet of the Access Point, no Mobile IP service is required on behalf of the node as shown at block 512. When the AP determines from the source address that the node is not located on the subnet of the Access Point, proxy Mobile IP service is required as shown at block 514. The AP may then obtain the access point information. Once the AP has obtained the access point information, the AP acts on behalf of the node and composes and sends a mobile IP registration request ion behalf of the node as shown at block 516. In accordance with one embodiment, the registration request is composed such that it specifies the gateway as the node's Home Agent.

As described above, each AP (and AAP) preferably maintains its own local subnet mapping table. FIG. 6 is a diagram illustrating an exemplary subnet mapping table that may be maintained by an AP in accordance with various embodiments of the invention. As shown, a subnet mapping table 602 may store a plurality of entries, each storing AP information for an access point. As shown, each entry specifies a subnet 604 and a gateway 608. In addition, each entry also preferably specifies a netmask 606 associated with the subnet 604. An IP address associated with an AP may also be specified at block 610 because the AAP uses the AP's IP address to send it an UPDATE message as well as other control messages. An entry is preferably stored for the AAP as well as other APs.

FIG. 7 is a diagram illustrating an exemplary active AP list that may be maintained by an AAP in accordance with various embodiments of the invention. As shown, list 702 of active access points identifies one or more access points. More specifically, the list 702 identifies those access points that are active. As shown, this may be accomplished by specifying an IP address 704 for each of the active access points. This list may include the IP address of the AAP.

FIGS. 8 through 13 illustrate exemplary packet formats of packets that may be sent as shown in FIGS. 4A through 4C. The control packets described above with reference to FIGS. 8 through 13 may be implemented in a unicast protocol such as User Datagram Protocol (UDP) or Transmit Control Protocol (TCP), as well as a multicast protocol.

Figure 8:
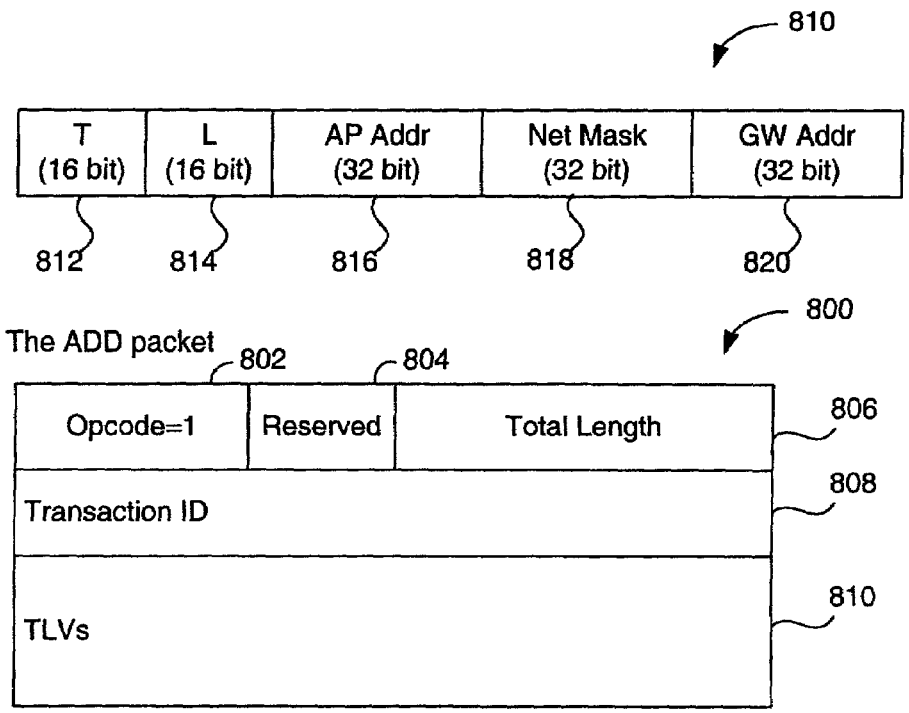
FIGS. 8 through 13 illustrate exemplary packet formats of packets that may be sent as shown in FIGS. 4A through 4C.

More specifically, FIG. 8 illustrates an exemplary ADD packet 800 that may be sent as described above with reference to FIG. 4A. As shown, each control packet specifies an Opcode 802 identifying the message (e.g., ADD). In addition, it may include a reserved field 804, a total length 806 of the ADD packet (e.g., in bits), and a transaction ID 808. The transaction ID 808 is used to distinguish different messages that are sent at different times. In addition, a Type-Length-Value (TLV) 810 is also specified. For instance, type field 812 may be a single type associated with all control packets, such as a type indicating that subnet map information is being transmitted, modified or otherwise requested. Length 814 indicates a length of the TLV field. An AP address 816 may be specified to enable an AP to be identified within a subnet mapping table as well as active AP list. A net mask 818 may also be specified to enable a subnet of the AP to be identified. In addition, a gateway address 820 is also specified to indicate a gateway to be used as a Home Agent by a node having a subnet matching that of the AP. In this manner, AP information associated with an AP may be added to a subnet mapping table.

Figure 9:
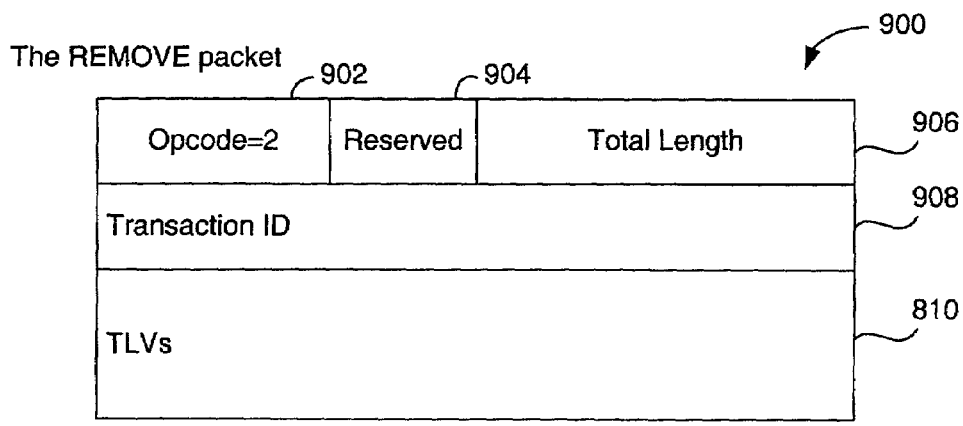

FIG. 9 illustrates an exemplary REMOVE packet 900 that may be sent as described above with reference to FIG. 4C. Similarly to the ADD packet described above with reference to FIG. 8, the REMOVE packet 900 specifies an Opcode 902 identifying the message (e.g., REMOVE), reserved field 904, total length 906, transaction ID 908, and TLV 810. Through the sending of a REMOVE packet 900, AP information associated with an AP may be removed from a subnet mapping table, as well as an active AP list.

Figure 10:
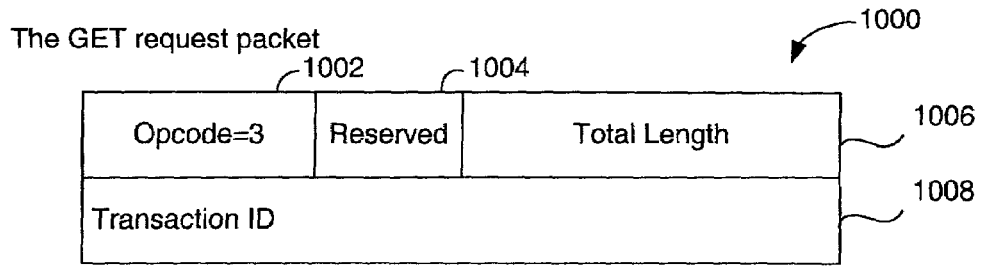

In order to obtain access point information associated with one or more access points (e.g., a subnet mapping table or portion thereof) as described above with reference to FIG. 4B, a request for this information is sent by an AP in a GET packet. FIG. 10 is a diagram illustrating an exemplary GET packet that may be sent by an AP. As shown, the GET packet 1000 specifies an opcode 1002, and may include a reserved field 1004 and a total length 1006. In addition, a transaction ID 1008 specifies a transaction ID, as described above.

Figure 11:
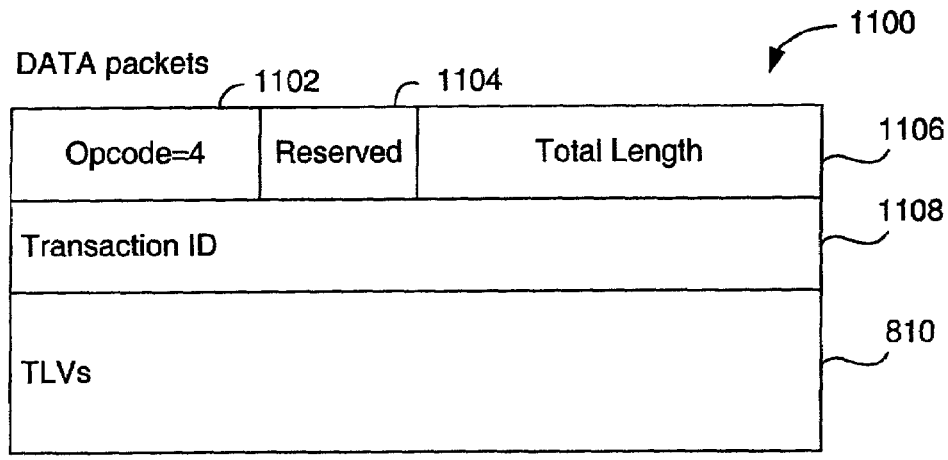

FIG. 11 is a diagram illustrating an exemplary DATA packet 1100 that may be sent as described above with reference to FIG. 4A and FIG. 4B. The data packet 1100 specifies an Opcode 1102 that indicates that the data packet is transmitting AP information. In addition, the data packet 1100 may include a reserved field 1104, a total length 110, transaction ID 1108, and TLV 810, as described above.

Figure 12:
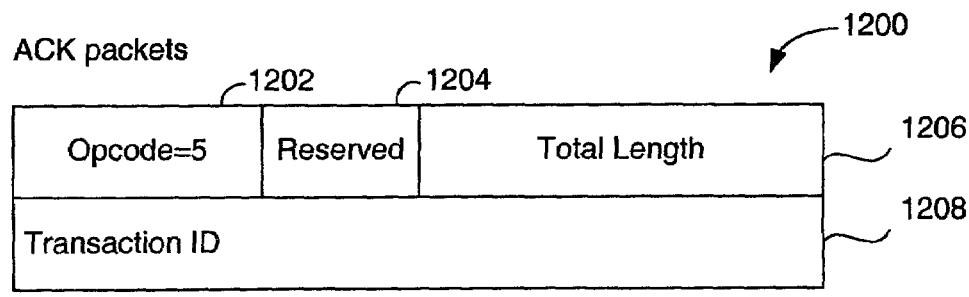

An acknowledgement packet (ACK) may be sent in response to various control commands such as the ADD or REMOVE packets as described above with reference to FIGS. 4A and 4C. FIG. 12 is a diagram illustrating an exemplary ACK packet that may be sent. As shown, ACK packet 1200 includes an opcode 1202, reserved field 1204, total length 1206, and transaction ID 1208.

Figure 13:
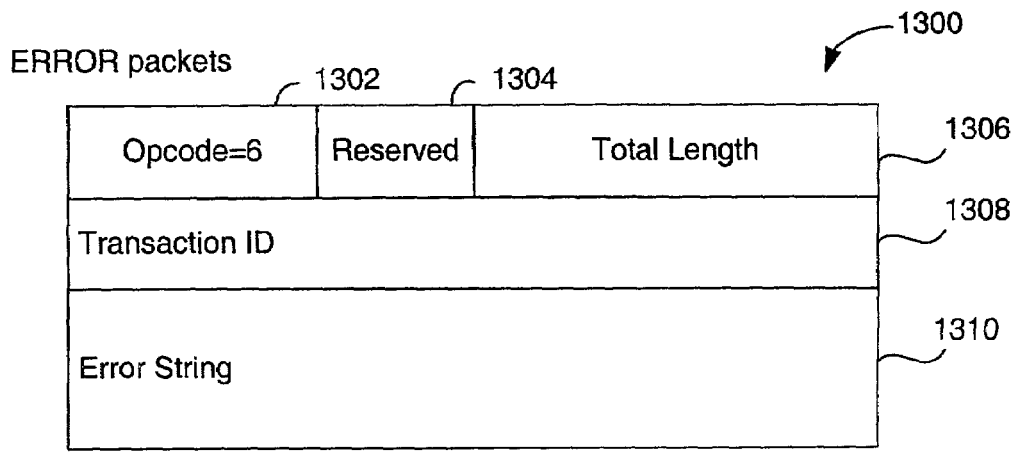

Similarly, an ERROR packet may be sent as described above with reference to FIGS. 4A and 4C. FIG. 13 is a diagram illustrating an exemplary ERROR packet 1300. The error packet 1300 includes an opcode 1302 indicating that the packet is an ERROR packet indicating the occurrence of an error, error code 1304 that indicates the type of error that has occurred, a total length 1306, transaction ID 1308, and error string 1310 that may be used to carry a string that may be displayed indicating that an error has occurred or the type of error that has occurred.

As described above, when a node that is roaming wishes to send a message to a corresponding node from its new location, a message from the roaming node is packetized and forwarded through the Foreign Agent it is visiting over the internet and to the corresponding node. Thus, when the node roams, it is desirable to redirect packets sent by the node to the appropriate Foreign Agent. In accordance with one embodiment, the access point is responsible for such redirection of packets. Since the access point redirects packets sent by the node through the appropriate Foreign Agent, it is desirable to notify the access point when registration is completed successfully.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Access Points of this invention may be implemented in specially configured routers or servers, as well as Cisco Aironet 350 Series Access Points, available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 14:
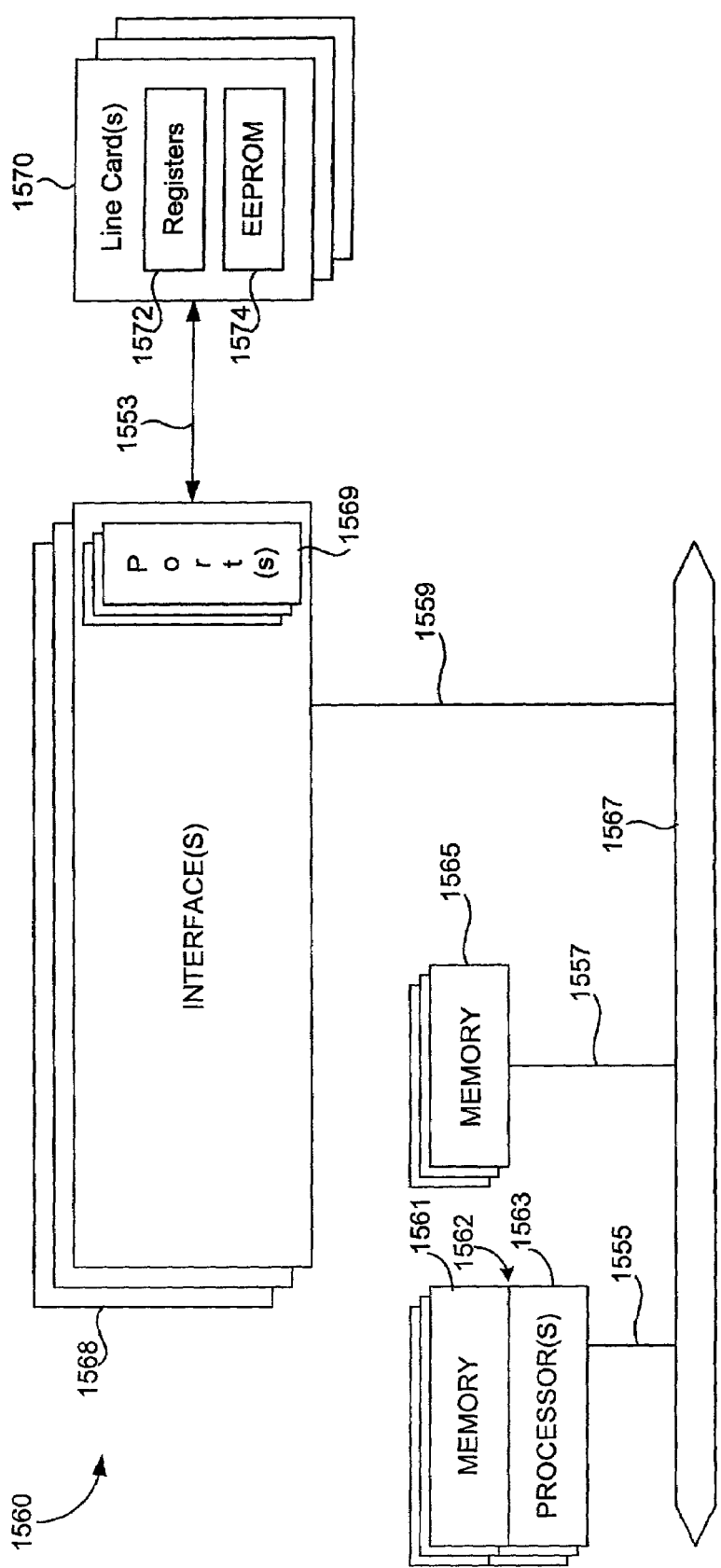
FIG. 14 is a block diagram of a network device that may be configured to implement aspects of the present invention.

Referring now to FIG. 14, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although not shown, various removable antennas may be used for further increase range and reliability of the access points. In addition, radio transmit power e.g., 1, 5, 20, 30, 50, and 100 mW) on the Cisco Aironet 350 Series is configurable to meet coverage requirements and minimize interference. In addition, a Cisco Aironet AP can be configured as a redundant hot standby to another AP in the same coverage area. The hot-standby AP continually monitors the primary AP on the same channel, and assumes its role in the rare case of a failure of the primary AP.

Although the system shown in FIG. 14 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described access points, other entities used to tunnel packets to mobile nodes on remote network segments can be used as well. For example, routers, bridges or other less intelligent packet switches may also employ the standby protocol of this invention. Moreover, although the present invention is useful for nodes that do not support Mobile IP, the invention may also be applicable for nodes that support Mobile IP. Moreover, the present invention may be applicable in a network supported by various protocols such as DHCP. In addition, each AP need not maintain local copies of the subnet mapping table. Rather, a centralized subnet mapping table may be maintained (e.g., by the AAP). In addition, control packets such as the ADD, GET, and REMOVE packets may be sent to multiple APs rather than solely to the AAP.

Accordingly, the present embodiments are to be considered as illustrative and not restrictive, and the invention is not to be limited to the details given herein, but may be modified within the scope and equivalents of the appended claims.

What is claimed is:

1. In a first access point, a method of supporting mobility for a node that does not support Mobile IP, comprising:
   receiving access point information from a second access point;
   storing the access point information received from the second access point such that a list of active access points is updated to include the access point information received from the second access point, the list of active access points including access point information associated with one or more active access points, the access point information received from the second access point including information identifying an access point subnet and a gateway associated with the second access point; and
   sending the access point information received from the second access point to a third access point that supports Mobile IP to notify the third access point that the second access point is an active access point, thereby enabling the third access point to compare a received data packet with the access point subnet to determine whether to send a registration request on behalf of the node using the gateway as the node's Home Agent.

2. The method as recited in claim 1, further comprising:
   receiving a data packet from the node, the data packet specifying a source address;
   determining from the source address whether the node is currently attached to a subnet identical to a subnet of the first access point;
   when it is determined from the source address that the node is currently attached to the subnet identical to the subnet of the first access point, no Mobile IP service is required on behalf of the node; and
   when it is determined from the source address that the node is not currently attached to the subnet identical to the subnet of the first access point, composing and sending a mobile IP registration request on behalf of the node.

3. The method as recited in claim 2, wherein determining from the source address whether the node is currently attached to a subnet identical to a subnet of the first access point comprises:
   comparing the source address with the access point information.

4. The method as recited in claim 2, wherein the mobile IP registration request specifies the gateway as the node's Home Agent.

5. The method as recited in claim 2, wherein determining from the source address whether the node is currently attached to a subnet identical to a subnet of the first access point comprises:
   ascertaining the access point subnet identical to that of the node; and
   determining whether the access point subnet identical to that of the node is different from that of the first access point.

6. The method as recited in claim 5, further comprising:
   when the access point subnet identical to that of the node is different from that of the first access point, obtaining the access point information including the gateway.

7. The method as recited in claim 1, further comprising:
   sending a request to the second access point for access point information associated with one or more active access points prior to receiving the access point information from the second access point, wherein the access point information received from the second access point includes access point information associated with one or more active access points.

8. The method as recited in claim 1, further comprising:
   receiving a request from the third access point for access point information associated with one or more active access points, wherein the access point information sent to the third access point includes access point information associated with one or more active access points.

9. The method as recited in claim 1, further comprising:
   receiving a remove message indicating that access point information associated with a specified access point is to be deleted prior to deleting the access point information associated with the specified access point; and
   deleting the access point information associated with the specified access point.

10. The method as recited in claim 1, further comprising:
    sending a remove message to one or more access points indicating that the access point information associated with a specified access point is to be deleted.

11. The method as recited in claim 1, further comprising:
    sending a remove message to the second access point indicating that active access points are to delete the access point information associated with a specified access point.

12. The method as recited in claim 1, further comprising:
    sending access point information associated with the first access point to one or more access points, the access point information associated with the first access point including an access point subnet and a gateway associated with the first access point.

13. The method as recited in claim 1, wherein the access point information is received from the second access point when the second access point powers up, wherein the access point information received from the second access point indicates that the second access point is active.

14. The method as recited in claim 1, wherein the access point information received from the second access point indicates that the second access point is active.

15. The method as recited in claim 1, wherein the access point information received from the second access point indicates that one or more access points are active.

16. The method as recited in claim 1, wherein the access point information does not include information associated with one or more nodes.

17. The method as recited in claim 1, wherein the access point information does not identify one or more nodes.

18. A first access point that supports mobility for a node that does not support Mobile IP, comprising:
   means for receiving access point information from a second access point;
   means for storing the access point information received from the second access point such that a list of active access points is updated to include the access point information information received from the second access point, the list of active access points including access point information associated with one or more active access points, the access point information received from the second access point including information identifying an access point subnet and a gateway associated with the second access point; and
   means for sending the access point information received from the second access point to a third access point that supports Mobile IP to notify the third access point that the second access point is an active access point, thereby enabling the third access point to compare a received data packet with the access point subnet to determine whether to send a registration request on behalf of the node using the gateway as the node's Home Agent.

19. A first access point that supports mobility for a node that does not support Mobile IP, comprising:
   a processor; and
   a memory, at least one of the processor and the memory being configured for:
      receiving access point information from a second access point;
      storing the access point information received from the second access point such that a list of active access points is updated to include the access point information received from the second access point, the list of active access points including access point information associated with one or more active access points, the access point information received from the second access point including information identifying an access point subnet and a gateway associated with the second access point; and
      sending the access point information received from the second access point to a third access point that supports Mobile IP to notify the third access point that the second access point is an active access point, thereby enabling the third access point to compare a received data packet with the access point subnet to determine whether to send a registration request on behalf of the node using the gateway as the node's Home Agent.

20. The first access point as recited in claim 19, wherein the first access point and the second access point support Mobile IP.

21. The first access point as recited in claim 19, wherein the first access point is responsible for sending the access point information received from the second access point to one or more additional access points.

22. The first access point as recited in claim 19, wherein the first access point is responsible for sending the access point information received from the second access point to one or more active access points.

23. The first access point as recited in claim 19, wherein the second access point is an active access point.

24. The first access point as recited in claim 19, wherein the third access point is an active access point.

25. The first access point as recited in claim 24, at least one of the processor and the memory being further configured for:
   identifying the third access point in the list of active access points that identifies one or more active access points prior to sending the access point information to the third access point.

26. The first access point as recited in claim 19, wherein the list of active access points comprises an IP address for each of the active access points.

27. The first access point as recited in claim 19, at least one of the processor and the memory being further configured for:
   sending access point information for one or more additional access points to the second access point, the access point information including an access point subnet and a gateway.

28. The first access point as recited in claim 19, wherein the access point information further comprises at least one of a netmask and an IP address associated with the second access point.

29. The first access point as recited in claim 19, wherein storing the access point information comprises:
   storing the access point information in a subnet mapping table including a plurality of entries, each of the plurality of entries being associated with a different access point.

30. The first access point as recited in claim 19, at least one of the processor and the memory being further configured for:
   deleting the access point information associated with the second access point if it is determined that the second access point is no longer active; and
   instructing the third access point to delete the access point information associated with the second access point.

31. The first access point as recited in claim 30, at least one of the processor and the memory being further configured for:
   removing an IP address associated with the second access point from a list of active access points.

32. A computer-readable medium storing thereon computer-readable instructions for supporting mobility for a node that does not support Mobile IP in a first access point, comprising:
   instructions for storing access point information received from a second access point such that a list of active access points is updated to include the access point information received from the second access point, the list of active access points including access point information associated with one or more active access points, the access point information received from the second access point including information identifying an access point subnet and a gateway associated with the second access point; and
   instructions for sending the access point information received from the second access point to a third access point that supports Mobile IP to notify the third access point that the second access point is an active access point, thereby enabling the third access point to compare a received data packet with the access point subnet to determine whether to send a registration request on behalf of the node using the gateway as the node's Home Agent.

* * * * *